Patented Mar. 19, 1946

2,397,018

UNITED STATES PATENT OFFICE 2,397,018

NONRESINOUS PHENOL-FORMALDEHYDE CONDENSATION PRODUCTS

John W. Kroeger and Harry F. O'Connor, Philadelphia, Pa., assignors to Fred'k H. Levey Co., Inc., New York, N. Y., a corporation of New York No Drawing. Application November 18, 1941, Serial No. 419,604

2 Claims. (Cl. 260—57)

This invention relates to non-resinous thermosetting condensation products of phenol and its homologues and derivatives with formaldehyde, and particularly to liquid products of relatively low viscosities and molecular weights which are stable under ordinary storage conditions but capable of resinification on the application of heat. Such products are useful as vehicles for pigments especially in the preparation of printing inks and coating compositions and may be employed for a variety of other purposes, as for example as adhesives in the preparation of laminated products from fabrics and other sheet materials. In mentioning such uses we do not intend to limit the application of the products to any specific purposes.

The condensation of phenolic compounds with formaldehyde has long been known and widely practised. However, in the ordinary procedure for the preparation of resins by condensation, the reaction mixtures are heated for comparatively long periods of time with relatively large amounts of catalyst material in order to effect reaction of the phenol with formaldehyde as completely as possible. The initial products of such reactions are generally referred to as "A"-stage resins. These materials are unstable compounds which are useful only in the preparation of more stable resins or of molding compounds including such resins. The constituents of such products continue to react after the initial treatment if they are stored, and eventually solid or semi-solid resinous materials result. Usually no attempt is made to store such initial products of the reaction or to utilize them for any purpose other than the production of solid or semi-solid resins.

It has not been known heretofore that by suitable manipulation and purification by commercially practicable methods, liquid products substantially stable under ordinary storage conditions can be prepared by condensation of phenolic compounds with formaldehyde. Consequently materials suitable for use as vehicles in inks and coating compositions and for other purposes requiring stability have not been produced by condensation of phenolic compounds with formaldehyde.

It is the object of the present invention to provide methods of preparing thermo-setting liquid products of low viscosities and molecular weights and of non-resinous nature, which remain stable under storage conditions and are capable of use as vehicles and for other purposes.

Other objects and advantages of the invention will be apparent as it is better understood by reference to the following specification, in which we have described the preferred embodiments of the invention, it being understood that the examples hereinafter set forth are not intended to restrict the invention.

It is known that by extensive manipulation, which is too expensive for ordinary commercial applications, it is possible to completely isolate and purify the constituent compounds of phenolic condensates to afford a series of pure, stable compounds. However, these compounds are generally crystalline solids, and such materials would have no value for the purpose of the present invention. To afford liquid products, it is necessary to maintain in the condensate a mixture of compounds, all of which may be normally crystalline when pure, but which in the mixture mutually depress the melting points of the several constituents, with the result that a permanently liquid product is produced. However, as we have already pointed out, the initial condensation products are in themselves unstable, and it is necessary to remove or inactivate the impurities which cause instability.

We have discovered that by properly controlling the reaction of a phenolic compound with formaldehyde and thereafter treating the product promptly to neutralize the alkaline catalyst and thereafter to remove the unreacted formaldehyde and the product of the neutralizing treatment, we are able to prevent further spontaneous reaction in the liquid condensate and thus afford stabilized liquid products which are non-resinous but capable of resinification by the application of heat. A variety of such products having differing physical constants can be produced, and these can be mixed to provide liquids having desirable characteristics for the particular purposes for which they are intended.

We have found that such purification can be readily accomplished by neutralizing the initial products of condensation with a weak acid such as lactic acid to a pH of 5.5 to 7.5, thereby inactivating the alkaline catalyst which is employed in the reacting mixture. Any suitable weak acid may be employed, as for example, glycolic, acetic, or benzoic acid. Following neutralization, the mixture is treated with a sulphite, bisulphite or meta-bisulphite of an alkali or alkaline earth metal in either the anhydrous or the hydrated form. Sodium bisulphite is employed preferably. The purpose of this treatment is to remove the unreacted formaldehyde. The organic layer is then separated for further treatment. If a water solution of formaldehyde is employed in the reaction, the product may be heated to 50–70° C. under vacuum for from 1 to 2 hours to remove most of the water. The latter treatment usually causes small amounts of inorganic compounds to crystallize from the product, and the material is therefore preferably filtered. The final product is relatively free from water, and contains no formaldehyde and inorganic compouds.

It is not, however, essential to employ water solutions of formaldehyde. Para-formaldehyde, the solid polymer of formaldehyde, may be substituted. In this case, water will not be present unless it is introduced with the compound containing the sulphite radical which is employed to remove the unreacted formaldehyde. In case the reactions are conducted in the absence of water, vacuum dehydration is not necessary. Filtration will remove inorganic compounds formed during the purification procedure. In any event, complete dehydration is not essential, as the products may contain upward to 5% of water or even more without resulting deterioration.

Examination of the values for water tolerance indicates that water is quite soluble in the products from phenol and m-cresol, but much less so in the products from 1,3,5-xylenol and p-ter. butyl phenol, particularly the latter. This means that products from the first group must be dehydrated by heating in vacuum. However, the products from the second group separate naturally from water as an organic layer containing only small amounts of dissolved water. When this behavior is coupled with the salting-out action of a soluble sulphite the amount of water dissolved in the organic product is reduced still further. Therefore these products need not be dehydrated in vacuum unless an absolutely anhydrous material is required.

The viscosity and other physical characteristics of the product will depend upon the particular phenolic compound which is initially introduced to the reaction and to a degree upon the treatment to which the mixture is subjected. All of the products are, however, oily materials of relatively low viscosity and are sufficiently stable so that they can be stored for many months with slight, if any, increase in viscosity.

In carrying out the invention, we may employ phenol and its homologues and derivatives, including p-ter. butyl phenol, m-cresol and 1,3,5-xylenol. These, however, are merely examples of the numerous phenolic compounds which are subject to condensation with formaldehyde in the preparation of products such as are herein described. The condensation of phenolic compounds with formaldehyde is, as we have indicated, a well known procedure, and is disclosed in numerous publications.

In preparing the desired product, a suitable phenolic compound is mixed with formaldehyde solution or alternatively with para-formaldehyde in proportions sufficient to afford an excess of formaldehyde for the reaction. To this mixture is added a small proportion of a solution of sodium hydroxide which acts as the catalyst in the reaction. The materials are stirred and heated to a relatively low temperature, varying somewhat between 55 and 85° C. The heating is continued for varying periods of from 1 to 2½ hours, depending upon the particular product desired.

Thereafter, the mixture is neutralized preferably with lactic acid or its equivalent, and sodium bisulphite or its equivalent, as hereinbefore described, is added while the mixture is stirred for from 2 to 15 hours at approximately room temperature or 25–30° C. The layers are then separated and the upper organic layer is removed and may be dehydrated, if necessary, by heating in a vacuum for from 1 to 3 hours at from 30–70° C. A vacuum of 50–35 millimeters is usually satisfactory. The dehydrated product is then filtered to remove the small amount of solid which may have crystallized therein.

The products are definitely non-resinous. Resins are commonly defined as complex, amorphous, solid or semi-solid materials and are usually a mixture of substances. When soft, gummy resins are chilled, they become glassy rather than crystalline. When they dissolve at all, they form colloidal solutions and not true solutions. In addition they display the phenomenon of plasticity. Ordinarily the molecular weights of resins are above 2,000, although instances of resins having lower molecular weights are known.

In contrast to resinous materials, our products are normally liquids of low viscosity, and although they are mixtures of several different compounds, they dissolve to give true solutions, not colloidal solutions. Being liquids, they show typical liquid flow and not plastic flow. The molecular weights determined as hereinafter described are far below the accepted limit of molecular weight for resins.

The physical characteristics of the various products hereinafter described in the examples have been determined as follows:

Absolute viscosity, in centipoises at\_\_\_\_°C\_\_ 30
Water tolerance, in cubic centimeters of water at _____°C\_\_ 25
Drying time, in seconds at_____°F\_\_ 320
Index of refraction, at_____°C\_\_ 25
Density, at_____°C\_\_ 25
Molecular weight, by freezing point method in dioxane.

Water tolerance determines the solubility of the particular condensate. The method used resembles the determination of the "aniline point" of oils. The procedure is as follows: Duplicate 5.00 gram samples of the condensate are dissolved in 25 cc. of absolute methanol. These solutions are held at 25° C. while distilled water is added dropwise from a burette with shaking. The end point is taken where the first permanent opalescence appears in the solution. Further addition of water causes a distinct cloudiness. The number of cubic centimeters of distilled water necessary to cause opalescence is called the "water tolerance." The average of the two determinations is recorded.

The drying time as hereinafter described is the length of time required for the material to resinify with heat. It is determined by spreading a thin film of the material on an electrically heated brass drum, the internal temperature of which is 320° F., and noting the number of seconds required to convert the film to a hard, dry state.

Molecular weights are determined by the depression of freezing point method in dioxane. Other physical constants mentioned were determined by standard methods. These need not be set forth in detail, as they are well understood in the art.

By varying the procedure, two distinct liquid products having different viscosities can be produced from each of the phenolic compounds treated. We have, in the following examples, described in detail the treatment of a number of such phenolic compounds to produce products of both low and high viscosity in terms of centipoises at 30° C. The variations in the procedure as described in the examples should be taken merely as illustrative of the general application of the invention and not as limitations of the invention.

EXAMPLE 1

*Phenol-formaldehyde vehicle (low viscosity)*

| | | |
|---|---|---|
| Phenol | g | 188 |
| 36.9% formaldehyde (neutral) | g | 178.8 |
| 10% sodium hydroxide (aqueous) | cc | 14.0 |

The reactants were combined and the solution was stirred while heating at 80–85° C. for 1.75 hours, then the product was neutralized to methyl-red by adding 3.1 cc. 85% lactic acid. The mixture contained 1.445% formaldehyde (by the hydroxylamine method) indicating that 1.007 moles of formaldehyde had condensed for every mole of phenol taken.

The mixture was stirred for two hours at 25–30° C. with 24 g. 95% sodium bisulfite. The layers were separated and the upper, organic layer was dehydrated by heating for 1 hour 10 min. at 30–60° C. in a vacuum of 50–35 mm. The dehydrated product was then filtered to remove the small amount of solid which had crystallized out.

| | |
|---|---|
| Yield | 240 g. |
| Free formaldehyde | 0.00% |
| Viscosity | 625 cps. at 30° C. |
| Water tolerance | 79.5 cc. at 25° C. |
| Drying time | 60 sec. at 320° F. |
| Density | 1.206 at 25° C. |
| Index of refraction | 1.5732 at 25° C. |
| Molecular weight | (in dioxane) 122.3 |

EXAMPLE 2

*Phenol-formaldehyde vehicle (high viscosity)*

| | | |
|---|---|---|
| Phenol | g | 188 |
| 36.9% formaldehyde (neutral) | g | 178.8 |
| 10% sodium hydroxide (aqueous) | g | 14.0 |

The solution was stirred and heated at 80–85° C. for 3.0 hours. The product was neutralized with 2.7 cc. 85% lactic acid. The mixture contained 0.34% formaldehyde indicating that 1.078 moles of formaldehyde had reacted for every mole of phenol taken.

The mixture was stirred for 14 hours with 15 g. 95% sodium bisulphite at 25–30° C. The layers were then separated and the organic layer was dehydrated by heating in vacuum for one hour at 30–70° C. and 60–15 mm. The product was then filtered to remove a small amount of solid which had crystalized out.

| | |
|---|---|
| Yield | 220 g. |
| Free formaldehyde | 0.00% |
| Viscosity | 19,800 cps. at 30° C |
| Water tolerance | 21.1 cc. at 25° C. |
| Drying time | 45 sec. at 320° F. |
| Density | 1.269 at 25° C. |
| Index of refraction | 1.5910 at 25° C. |
| Molecular weight | (in dioxane) 168.4 |

EXAMPLE 3

*p-ter. Butylphenol-formaldehyde vehicle (low viscosity)*

| | | |
|---|---|---|
| p-ter. Butylphenol | g | 150 |
| 36.9% formaldehyde (neutral) | g | 102 |
| 10% sodium hydroxide | cc | 5.0 |

The mixture was stirred and heated at 80–85° C. for three hours. The product was neutralized by adding 0.5 cc. 85% lactic acid. Analysis indicated that 0.998 mole of formaldehyde had reacted.

Thirty grams of 95% sodium bisulfite was then added and the mixture was stirred at 25–30° C. for three hours. The layers were separated and the upper, organic layer was evacuated for a few minutes without heating to remove a small quantity of free water.

| | |
|---|---|
| Free formaldehyde | 0.00% |
| Viscosity | 218 cps. at 30° C. |
| Water tolerance | 7.2 cc. at 25° C. |
| Drying time | 200 sec. at 320° F. |
| Density | 1.049 at 25° C. |
| Index of refraction | 1.5252 at 25° C. |
| Molecular weight | (in dioxane) 132.9 |

EXAMPLE 4

*p-ter. Butylphenol-formaldehyde vehicle (high viscosity)*

| | | |
|---|---|---|
| p-ter. Butylphenol | g | 150 |
| 36.9% formaldehyde (neutral) | g | 102 |
| 10% sodium hydroxide | cc | 5.0 |

The mixture was stirred and heated at 80–85° C. for six hours, then was neutralized by adding 0.4 cc. 85% lactic acid. Analysis for formaldehyde showed that 1.06 moles had condensed.

The product was stirred with 25 g. 95% sodium bisulphite during three hours at 25–30° C. The organic layer was then separated and heated in vacuum at 50–66° C. and 40–20 mm. for 1 hour.

| | |
|---|---|
| Yield | 1.79 g. |
| Free formaldehyde | 0.00% |
| Viscosity | 14,500 cps. at 30° C. |
| Water tolerance | 2.1 cc. at 25° C. |
| Drying time | 180 sec. at 320° F. |
| Density | 1.059 at 25° C. |
| Index of refraction | 1.5396 at 25° C. |
| Molecular weight | (in dioxane) 208.9 |

EXAMPLE 5

*m-Cresol-formaldehyde vehicle (low viscosity)*

| | | |
|---|---|---|
| m-Cresol (80–2%) | g | 216 |
| 36.9% formaldehyde (neutral) | g | 195 |
| 10% sodium hydroxide | cc | 8.0 |

The solution was stirred and heated at 63–5° C. for 2 hours, 10 minutes, then was neutralized by adding 1.5 cc. 85% lactic acid. A formaldehyde analysis showed that 1.018 moles had condensed for each mole of m-cresol taken.

The product was stirred for three hours at room temperature with 50 g. 95% sodium bisulphite. The organic layer was then dehydrated by heating for one hour at 30–55° C. in a vacuum of 60–20 mm. The product (265.5 g.) was filtered to remove a small quantity of the formaldehyde-sodium bisulphite complex giving a clear pale-yellow oil.

| | |
|---|---|
| Free formaldehyde | 0.00% |
| Viscosity | 1,474 cps. at 30° C. |
| Water tolerance | 62.2 cc. at 25° C. |
| Drying time | 30 sec. at 320° F. |
| Density | 1.169 at 25° C. |
| Index of refraction | 1.5629 at 25° C. |
| Molecular weight | (in dioxane) 130.3 |

EXAMPLE 6

*m-Cresol-formaldehyde vehicle (high viscosity)*

The same quantities of reagents and procedure were used as in Example 5 except that the mixture was reacted for 2.5 hours. The product was neutralized with 1.6 cc. 85% lactic acid. Analysis for formaldehyde showed that 1.052 moles had condensed for each mole of cresol taken.

Forty grams of 95% sodium bisulphite was added and the mixture was stirred for three hours at room temperature. The organic layer was separated and stripped in vacuum by heating for one hour at 30–60° C. and 60–10 mm. The product (269.5 g.) was filtered as in Example 5 and gave a clear, pale-yellow syrup.

| | |
|---|---|
| Free formaldehyde | 0.00% |
| Viscosity | 4,300 cps. at 30° C. |
| Water tolerance | 49.9 cc. at 25° C. |
| Drying time | 25 sec. at 320° F. |
| Density | 1.191 at 25° C. |
| Index of refraction | 1.5686 at 25° C. |
| Molecular weight | (in dioxane) 155.2 |

EXAMPLE 7

*1,3,5-xylenol-formaldehyde vehicle (low viscosity)*

| | |
|---|---|
| 1,3,5-xylenol fraction (b. 217–225° C) | g__ 122 |
| 36.9% formaldehyde (neutral) | g__ 97.5 |
| 10% sodium hydroxide | cc__ 4.5 |

The mixture was stirred and heated at 56–58° C. for two hours, then was neutralized by adding 0.9 cc. 85% lactic acid. The formaldehyde analysis showed that 0.983 mole had condensed.

The mixture was then stirred for three hours at 25–30° C. with 27.5 g. 95% sodium bisulphite. The organic layer was separated. Heating under vacuum was unnecessary in this case.

| | |
|---|---|
| Yield | 162.1 g. |
| Free formaldehyde | 0.00% |
| Viscosity | 212 cps. at 30° C. |
| Water tolerance | 23.1 cc. at 25° C. |
| Drying time | 20 sec. at 320° F. |
| Density | 1.118 at 25° C. |
| Index of refraction | 1.5447 at 25° C. |
| Molecular weight | (in dioxane) 97.8 |

EXAMPLE 8

*1,3,5-xylenol-formaldehyde vehicle (high viscosity)*

The same procedure and quantities of reagents were used as in Example 7 except that the reaction time was 2.5 hours. The product was neutralized to methyl red by adding 0.9 cc. 85% lactic acid, then was analyzed for formaldehyde. The result showed that 1.042 moles of formaldehyde had condensed.

The product was stirred for three hours at room temperature with 25 g. 95% sodium bisulphite, then the layers were separated. The organic layer was heated for a half-hour at 30–40° C. and 60–10 mm. The product (149.2 g.) was filtered to remove a slight turbidity.

| | |
|---|---|
| Free formaldehyde | 0.00% |
| Viscosity | 5,160 cps. at 30° C. |
| Water tolerance | 12.6 cc. at 25° C. |
| Drying time | 17 sec. at 320° F. |
| Density | 1.143 at 25° C. |
| Index of refraction | 1.5673 at 25° C. |
| Molecular weight | (in dioxane) 136.3 |

As will be evident from the foregoing examples, a number of different products, in so far as physical constants are concerned, may be produced by the practice of the invention. Viscosity may vary widely, as for example from 212 centipoises up to 19,800 centipoises or more generally between 200 and 20,000 centipoises at 30° C. These are, of course, not necessarily limits, as other similar products produced in accordance with the invention might extend the range to some degree. Water tolerance likewise varies, as do the drying time and other characteristics. It is characteristic of the products that the index of refraction is higher than that of the phenolic compound used by 0.02 to 0.05 unit and the density is greater than that of the phenolic compound used by 0.07 to 0.20 unit.

The products are all oily liquids which are substantially stable because they have been freed from impurities which would normally result in a continuance of the reaction and the ultimate modification of the products to resinous materials. The products have the common characteristic that they may be utilized as vehicles for pigments and for other similar purposes, and may be rapidly converted by the application of heat into resinous material. They are peculiarly adapted for application in the form of films carrying coloring pigments, as for example in the printing ink and coating composition fields where drying may be effected rapidly by heating the printed or coated material. The products are likewise well adapted for use as adhesives in the production of veneered and similar laminated products, since they may be applied in the liquid form and converted into resins upon heating to relatively low temperatures.

Various changes may be made in the invention, and particularly in the details of procedure, without departing from the invention or sacrificing the advantages thereof.

We claim:

1. A non-resinous, thermo-setting, stable liquid product of the reaction of a phenolic compound from the class consisting of mono-hydroxy benzene and its carbon alkylated products with formaldehyde, said liquid product being free from formaldehyde and having a viscosity approximately between 200 and 20,000 centipoises at 30° C., having an index of refraction higher than that of the phenolic compound by 0.02 to 0.05 unit, and having a density greater than that of the phenolic compound by 0.0 to 0.20 unit.

2. A non-resinous, thermo-setting stable liquid product of the reaction of a phenolic compound from the class consisting of mono-hydroxy benzene and its carbon alkylated products with formaldehyde, said liquid product being free from formaldehyde and substantially free from water, having a viscosity approximately between 200 and 20,000 centipoises at 30° C., having an index of refraction higher than that of the phenolic compound by 0.02 to 0.05 unit, and having a density greater than that of the phenolic compound by 0.07 to 0.20 unit.

JOHN W. KROEGER.
HARRY F. O'CONNOR.